(12) United States Patent
Oberle et al.

(10) Patent No.: US 9,242,578 B2
(45) Date of Patent: Jan. 26, 2016

(54) THREADED SPINDLE ADJUSTING DRIVE

(75) Inventors: Hans-Juergen Oberle, Rastatt (DE); Andreas Lienig, Buehl (DE)

(73) Assignee: ROBERT BOSCH GMBH, Stuttgart (DE)

( * ) Notice: Subject to any disclaimer, the term of this patent is extended or adjusted under 35 U.S.C. 154(b) by 651 days.

(21) Appl. No.: 12/734,938

(22) PCT Filed: Oct. 15, 2008

(86) PCT No.: PCT/EP2008/063815
§ 371 (c)(1),
(2), (4) Date: Sep. 10, 2010

(87) PCT Pub. No.: WO2009/074377
PCT Pub. Date: Jun. 18, 2009

(65) Prior Publication Data
US 2011/0000328 A1 Jan. 6, 2011

(30) Foreign Application Priority Data
Dec. 11, 2007 (DE) .......................... 10 2007 059 558

(51) Int. Cl.
*F16H 3/06* (2006.01)
*B60N 2/06* (2006.01)
*B60N 2/02* (2006.01)

(52) U.S. Cl.
CPC .............. *B60N 2/067* (2013.01); *B60N 2/0232* (2013.01); *Y10T 74/18576* (2015.01)

(58) Field of Classification Search
CPC ................ F16H 25/20; F16H 25/2204; F16H 2025/2078; F16H 1/16; F16H 2025/209
USPC .......................................................... 74/89.23
See application file for complete search history.

(56) References Cited

U.S. PATENT DOCUMENTS

| | | | | |
|---|---|---|---|---|
| 2,328,897 | A * | 9/1943 | Gill ........................... | 192/142 R |
| 2,981,518 | A * | 4/1961 | Wise .............................. | 254/101 |
| 4,630,999 | A * | 12/1986 | De La Harpe ................. | 416/167 |
| 5,320,413 | A * | 6/1994 | Griswold et al. ........ | 297/362.12 |
| 5,735,668 | A * | 4/1998 | Klein ......................... | 415/172.1 |
| 5,987,871 | A * | 11/1999 | Winzen ......................... | 57/406 |
| 6,927,513 | B2 * | 8/2005 | Schreier ..................... | 310/75 D |
| 7,066,041 | B2 * | 6/2006 | Nielsen ........................ | 74/89.35 |
| 7,533,590 | B2 * | 5/2009 | Cirio ............................ | 74/89.23 |
| 7,611,128 | B2 * | 11/2009 | Wu .............................. | 254/233 |
| 7,625,125 | B2 * | 12/2009 | Kull et al. ..................... | 384/107 |
| 7,628,087 | B2 * | 12/2009 | Gerbier et al. ............... | 74/89.23 |

(Continued)

FOREIGN PATENT DOCUMENTS

DE   10 2004 042 457   3/2006
DE   10 2005 046 356   3/2007

(Continued)

*Primary Examiner* — William Kelleher
*Assistant Examiner* — Zakaria Elahmadi
(74) *Attorney, Agent, or Firm* — Kenyon & Kenyon LLP

(57) ABSTRACT

A threaded spindle adjusting drive, e.g., a vehicle seat adjusting drive, includes a threaded spindle, a drive gear operably connected to the threaded spindle, and a bearing system for supporting axial and radial forces from the threaded spindle and/or the drive gear on a jacketed pipe. The bearing system has an axial bearing element abutting on at least one radially inwardly directed crimp of the jacketed pipe for supporting axial forces and a radial bearing ring abutting on the inner circumference of the jacketed pipe for supporting radial forces.

13 Claims, 1 Drawing Sheet

(56) References Cited

U.S. PATENT DOCUMENTS

| | | |
|---|---|---|
| 7,779,973 B2 * | 8/2010 | Ko ................................ 188/300 |
| 7,841,250 B2 * | 11/2010 | Eberlein et al. .............. 74/89.23 |
| 7,866,225 B2 * | 1/2011 | Oberle et al. ................. 74/89.37 |
| 7,990,003 B2 * | 8/2011 | Suyama et al. ................. 310/83 |
| 7,992,456 B2 * | 8/2011 | Schroeder et al. ........... 74/89.39 |
| 8,033,192 B2 * | 10/2011 | Oberle et al. ............... 74/89.23 |
| 8,083,590 B2 * | 12/2011 | Nourry ........................... 463/38 |
| 8,113,074 B2 * | 2/2012 | Wohrle et al. ............... 74/89.23 |
| 2003/0188948 A1 * | 10/2003 | Krzesicki ..................... 192/84.6 |
| 2006/0101931 A1 * | 5/2006 | Zimmermann .............. 74/89.23 |
| 2007/0289135 A1 | 12/2007 | Oberle et al. |
| 2007/0290556 A1 * | 12/2007 | Hochhalter et al. ............ 310/12 |
| 2008/0173117 A1 * | 7/2008 | Kawata et al. ............... 74/89.23 |
| 2008/0295624 A1 | 12/2008 | Oberle et al. |
| 2010/0213341 A1 * | 8/2010 | Beneker et al. ................ 248/419 |
| 2011/0290050 A1 * | 12/2011 | Kummer et al. ............. 74/89.37 |
| 2012/0024092 A1 * | 2/2012 | Schonherr et al. ........... 74/89.23 |

FOREIGN PATENT DOCUMENTS

| | | | |
|---|---|---|---|
| DE | 10 2005 046 357 | 3/2007 | |
| DE | 10 2006 006 925 | 8/2007 | |
| DE | 10 2006 020 174 | 11/2007 | |
| WO | WO 2007036389 A1 * | 4/2007 | ............... B60N 2/02 |

* cited by examiner

THREADED SPINDLE ADJUSTING DRIVE

BACKGROUND OF THE INVENTION

1. Field of the Invention

The present invention relates to a threaded spindle adjusting drive, e.g., a vehicle seat adjusting drive.

2. Description of Related Art

Published German patent document DE 10 2005 046 356 A1 describes a threaded spindle adjusting drive in the form of a rotary spindle drive for adjusting a movable part in a motor vehicle. The known adjusting drive comprises a radial bearing for supporting radial forces acting on a drive gear in the form of a worm gear on a support pipe as well as an axial bearing for supporting axial forces on a stop disk, which is accommodated in a pot-shaped bearing support, which rests in the axial direction on an mounting module fastened on the support pipe. Both the bearing support as well as the stop disk are made of metal.

A threaded spindle adjusting drive having a combined axial/radial bearing is known to the applicant internally within the applicant's firm, which has a one-part bearing element made of metal that is used to support both axial forces as well as radial forces on a jacketed pipe. The bearing element rests in the radial direction on the inner circumference of the jacketed pipe and in the axial direction on radially inward directed crimps of the jacketed pipe. A disadvantage of the simple construction is the comparatively high weight, due to the fact that the bearing element is made of metal, as well as the difficulty of being able to adhere to tight tolerances in the manufacture.

BRIEF SUMMARY OF THE INVENTION

An objective of the present invention is to provide a threaded spindle adjusting drive, the bearing system of which has on the one hand a simpler construction and on the other hand, if required, may be manufactured in a simple manner in a weight-reduced variant. In particular, it is to be possible to adhere more reliably to tolerances in the manufacture.

The present invention is based on the idea of providing two different components for supporting the axial forces and for supporting the radial forces on the jacketed pipe, which, however, may also be developed as a composite component, as will be explained later. Providing two separate components, that is, an axial bearing element and a radial bearing ring, makes it possible to develop the components from different materials. In particular, as will be explained later, it is possible to develop the radial bearing ring from plastic due to the available large support surface and the resulting low compressive load per unit area, without thereby having to accept losses of strength of the entire bearing system. With a view to developing the threaded spindle adjusting drive in a manner that is structurally as simple as possible and as cost-effective as possible, the axial bearing element rests directly on a jacketed pipe, in particular of metal, that accommodates the bearing system inside, that is, on at least one crimp directed radially inward, preferably on multiple crimps of the jacketed pipe spaced apart from one another in the circumferential direction and directed radially inward. Since the compressive load per unit area is particularly high due to the small support surface formed by the front sides of the crimps, a specific embodiment is preferred in which the axial bearing element is developed from metal. By separating the axial bearing element from the radial bearing ring, the crimping forces required for producing the crimps are decoupled from the radial bearing such that the crimping forces do not influence the narrowly toleranced bearing diameter. Consequently, it is possible to maintain specified tolerances reliably.

A further development of the present invention advantageously provides for the axial bearing element to be made of metal due to the merely small support surface on the jacketed pipe or on the at least one crimp of the jacketed pipe. This is preferably a hardened metal, preferably a hardened steel, so as to ensure sufficient stability at high compressive loads per unit area. At the same time it is possible to develop the radial bearing ring from a less firm material, in particular from plastic, and thus to achieve not only a reduction in cost, but also a reduction in weight. The separation of the axial bearing element and the radial bearing ring thus makes it possible to limit the use of high-quality and heavy materials to those places where they are (absolutely) necessary. Particularly advantageous is a specific embodiment of the radial bearing ring in which the latter is developed as an injection-molded plastic part. A radial bearing ring developed in this way is not only simple and cost-effective to manufacture as a mass product, but also allows for small tolerances to be maintained.

An example embodiment is particularly advantageous in which the axial bearing element and the radial bearing ring are situated abutting against each other. For this purpose, a specific embodiment may be realized, in which the axial forces of the threaded spindle and/or the drive gear are not directly supported by the axial bearing element, but rather only indirectly. In such an example embodiment, the radial bearing ring is used as an axial force transmission element, which rests in the axial direction on the axial bearing element, which in turn directly abuts on the at least one crimp of the jacketed pipe.

With a view of a simplified assembly of the bearing system, a specific embodiment is preferred, in which the axial bearing element and the radial bearing ring are developed as a composite part, the axial bearing element being injection-molded into the radial bearing ring, for example, or being extrusion-coated in parts by the latter. Alternatively, it is conceivable to preassemble the axial bearing element, i.e. to develop it as a composite component with the jacketed pipe. It is also possible to mount the axial bearing element and the radial bearing ring in succession. For manufacturing the axial bearing element, it is expedient to develop it as a stamped part from metal. The radial bearing ring is preferably an injection-molded part from a thermoplastic plastic.

An example embodiment of the threaded spindle adjusting drive as a rotary spindle drive is particularly advantageous. In this specific embodiment, the drive gear, developed particularly as a worm gear, is connected either in a rotatably fixed manner to the threaded spindle or is connectible or is developed in one piece with the threaded spindle such that the drive gear is stationary relative to the threaded spindle. In such a development, the drive gear driven directly or indirectly via a transmission by a, in particular electrical, drive motor drives the threaded spindle in a rotating manner, a threaded nut sitting on the threaded spindle, preferably at a distance from the drive gear, which is connected to a component to be adjusted directly or indirectly, for example via a lever system. By rotating the threaded spindle, the spindle nut is adjusted together with the component to be adjusted in the axial direction relative to the threaded spindle. In an adjusting drive in the form of a rotary spindle drive, a specific embodiment is preferred, in which the threaded spindle and/or the drive gear rest(s) on the axial bearing element in the axial direction via a ball preferably situated on the longitudinal center axis of the threaded spindle. In order to be able to absorb this essentially punctiform surface load, the axial bearing element is preferably developed from a hardened metal. Particularly preferably, a bearing receptacle for the ball is provided on the drive gear or on a component connected to the drive gear in a rotatably fixed manner.

It is particularly preferred if the axial bearing element is developed as a, in particular, circular disk. In this instance, the outer diameter of the axial bearing element preferably corresponds, at least approximately, to the outer diameter of the radial bearing ring in order to allow for an installation inside the jacketed pipe. With its front side facing away from the threaded spindle, the axial bearing element rests in the axial direction preferably on multiple crimps of the jacketed pipe spaced part in the circumferential direction.

According to an alternative example embodiment, the threaded spindle adjusting drive is developed as an immersion spindle drive, that is, an adjusting drive, in which the threaded spindle penetrates the drive gear, which is preferably driven directly by an electric drive motor, in the axial direction. The threaded spindle is preferably supported on one end in a rotatably fixed manner, the threaded spindle rotating in the axial direction relative to the drive gear when the drive gear is turned. In the process, a component to be adjusted, which is coupled to the threaded spindle, moves with the threaded spindle. The drive motor together with the jacketed pipe and the worm gear are rotatably fixed in the system relative to the axis of rotation of the threaded spindle, the fastening bore in the jacketed pipe allowing for the drive motor to tilt together with the threaded spindle about a fastening bore axis, i.e. allowing for an angular adjustment.

In a threaded spindle adjusting drive in the form of an immersion spindle drive, the axial bearing element is preferably shaped as a ring and is penetrated in the axial direction by the threaded spindle.

It is particularly preferred if the annular axial bearing element does not rest directly on the drive gear, but rather only indirectly via the radial bearing ring, which preferably abuts on the drive gear in the axial direction, preferably on a ring shoulder of the drive gear.

DETAILED DESCRIPTION OF THE INVENTION

Identical components and components having the same function are labeled by the same reference symbols in the figures.

Figure 1:
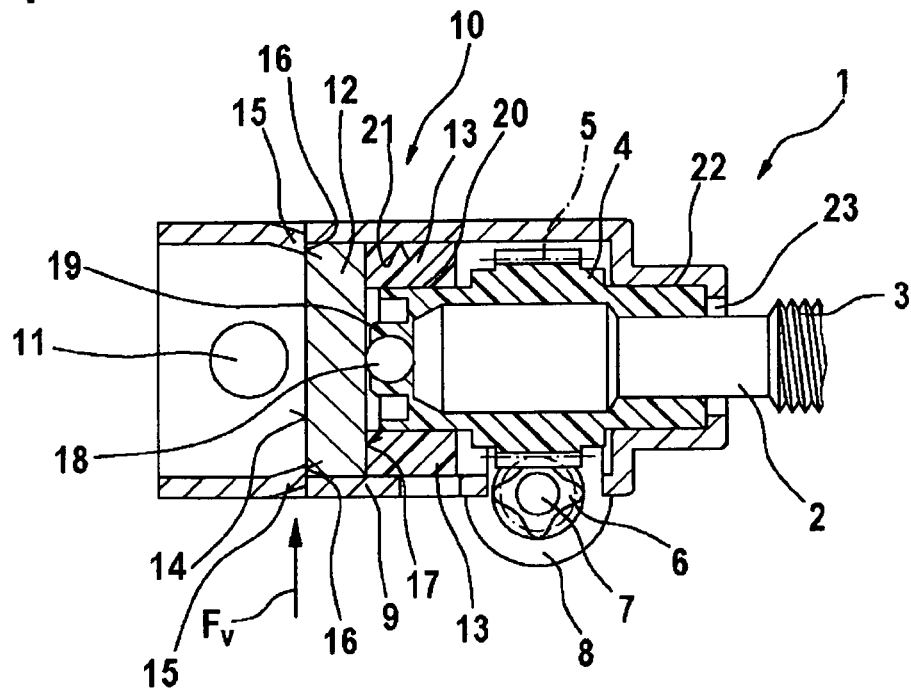
FIG. 1 shows a threaded spindle adjusting drive in the form of a rotary spindle drive for adjusting a motor vehicle part.

FIG. 1 shows a threaded spindle adjusting drive 1 in the form of a rotary spindle drive, in this case a motor vehicle seat adjusting drive. Threaded spindle adjusting drive 1 comprises a threaded spindle 2 having an external thread 3, which mates with a spindle nut (not shown), which is connected to a component to be adjusted. By rotating threaded spindle 2, the spindle nut is adjusted together with the vehicle part to be adjusted axially relative to threaded spindle 2.

Threaded spindle 2 is connected in a rotatably fixed manner to drive gear 4, which is developed as a worm gear and whose worm gearing 5 mates with a threaded gear worm 6, which sits on a motor shaft 7 of an electric drive motor 8. Motor shaft 7 runs perpendicular to the longitudinal extension of threaded spindle 2.

While adjusting drive 1 is in operation, forces are acting on drive gear 4 both in the radial as well as in the axial direction.

A bearing system 10 is provided to support the axial and radial forces from threaded spindle 2 and/or drive gear 4 acting on a jacketed pipe 9. Jacketed pipe 9 has a through hole 11 having a circular cross section, which runs through the entire jacketed sleeve 9 at an axial distance from threaded spindle 2 in the transverse direction. Through hole 11 is used to fasten jacketed pipe 9 in a rotatably fixed manner in a housing and/or on the vehicle body (not shown). Jacketed pipe is able to tilt about the axis of through hole 11, however.

Bearing system 10 comprises an axial bearing element 12 as well as a radial bearing ring 13 abutting on the latter in the axial direction. Axial bearing element 12 and radial bearing ring 13 are developed as separate components. If required, these components may also be manufactured in one piece as a composite component. A specific embodiment is likewise possible in which axial bearing element 12 is developed as a composite component together with jacketed pipe 9.

Axial bearing element 12 is developed as an annular disk from hardened steel and rests with a front side 14 facing away from threaded spindle 2 in the axial direction toward the left in the drawing plane on multiple crimps 15 of jacketed pipe 9, which are spaced apart in the circumferential direction and face radially inward. More precisely, front side 14 rests on front sides 16 of crimps 15 facing front side 14. Crimps 15 are developed as radially inwardly directed jacket surface sections of jacketed pipe 9, which were introduced into jacketed pipe 9 by applying a crimping force $F_v$ directed radially from outside toward the inside onto jacketed pipe 9. In the exemplary embodiment shown in FIG. 1, the disk-shaped axial bearing element 12 is developed as a stamped part, which has a front side 17 that is parallel to front side 14 but facing threaded spindle 2.

Threaded spindle 2 and drive gear 4 are supported via a ball 18 centrally in the axial direction on front side 17 of axial bearing element 12. Ball 18, which is made of steel, is accommodated in a bearing receptacle 19 situated on the front side on drive gear 4, which is developed as an injection-molded part. Alternatively, ball 18 may also be accommodated in a bore of the spindle and be fastened by crimping for example. At a radial distance from ball 18, drive gear 4 rests with a circumferential section 20 on radial bearing ring 13. Radial bearing ring 13 in turn abuts on inner circumference 21 of jacketed pipe 9 and braces the radial forces acting on drive gear 4 against jacketed pipe 9. In the exemplary embodiment shown, radial bearing ring 13 is developed as a plastic injection-molded part. On the whole, this saves approximately 25 g in weight compared to a specific embodiment in which axial bearing element 12 and radial bearing ring 13 are developed as a single-piece metal component. On the side of worm gearing 5 of drive gear 4 opposite from radial bearing ring 13, drive gear 4 rests in the radial direction with another circumferential section 22 directly on a stepped inner circumference of jacketed pipe 9. A through hole 23 is created in jacketed pipe 9 on the right side in the drawing plane, through which threaded spindle 2 projects with an unthreaded section into jacketed pipe 9.

Figure 2:
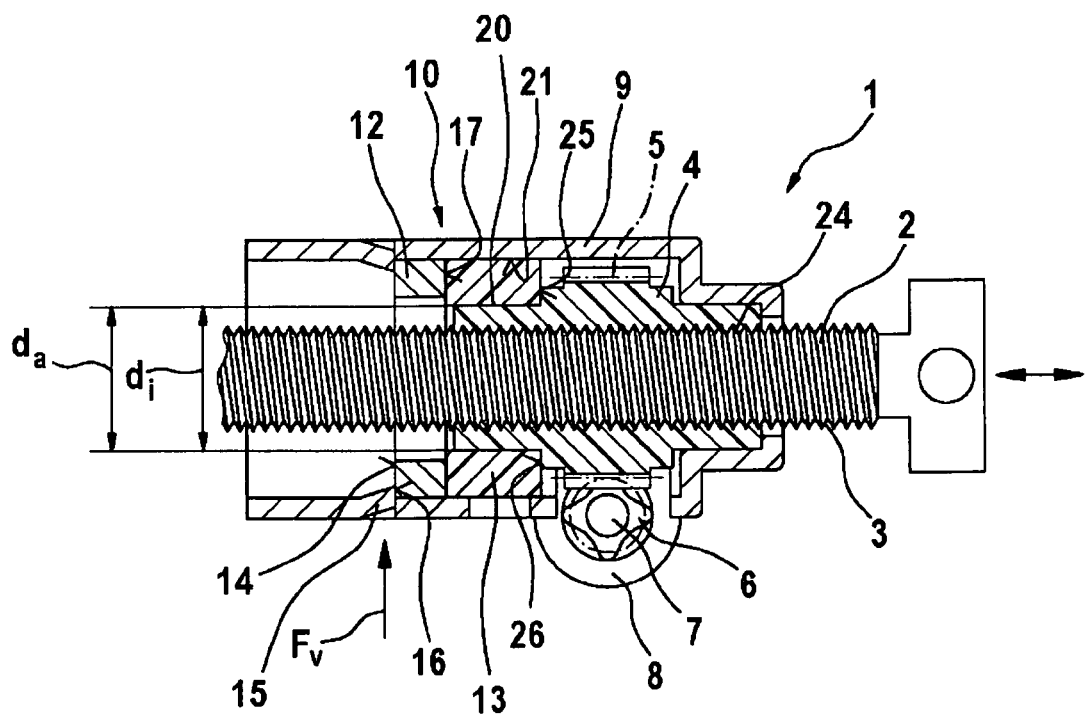
FIG. 2 shows a threaded spindle adjusting drive in the form of an immersion spindle drive for adjusting a motor vehicle component.

FIG. 2 shows an alternative exemplary embodiment of a threaded spindle adjusting drive 1. The latter is developed as an immersion spindle drive in the exemplary embodiment shown in FIG. 2. To avoid repetitions, merely the differences with respect to the exemplary embodiment shown in FIG. 1 will be explained in the following. With respect to the commonalities, reference is made to FIG. 1 together with the associated description of the figure.

In adjusting drive 1 shown in FIG. 2, drive gear 4 is penetrated in the axial direction by threaded spindle 2, more precisely by an external thread section of threaded spindle 2.

Stationary drive gear 4 has an internal thread 24, which mates with external thread 3 of threaded spindle 2. If drive gear 4 developed as a worm gear is driven to rotate by stationary drive motor 8 via motor shaft 7 and gear worm 6, threaded spindle 2 is adjusted in the axial direction relative to drive gear 4 as a result of the threaded coupling with drive gear 4. Threaded spindle 2 also adjusts a vehicle component (not shown) attached to its end relative to drive motor 8.

Bearing system 10 for supporting axial and radial forces comprises an axial bearing element 12 made of hardened steel, which has an annular shape in this exemplary embodiment. With its front side 14 facing away from drive gear 4, axial bearing element 12 abuts directly on crimps 15 of jacketed pipe or their front sides 16, which are spaced in the circumferential direction, and thus braces axial forces directly on jacketed pipe 9. As in the exemplary embodiment shown in FIG. 1, the outer diameter of axial bearing element 12 corresponds to the outer diameter of radial bearing ring 13. Radial bearing ring 13 rests on the front side 17 of axial bearing element 12 facing away from front side 14. Radial bearing ring 13 in turn abuts on the one hand with its outer jacket surface on inner circumference 21 of jacketed pipe 9 and with its inner circumference surface on a circumferential section 20 of drive gear 4, circumferential section 20 projecting into radial bearing ring 13 in the axial direction.

As may be seen from FIG. 2, the radial extension of radial bearing ring 13, which is developed from plastic in the exemplary embodiment shown, is greater than the radial extension of axial bearing element 12. With a front-facing ring surface 25 facing away from axial bearing element 12, radial bearing ring 13 rests in the axial direction on a ring shoulder 26 of drive gear 4. Inner diameter $d_i$ of radial bearing ring 13 as well as the corresponding outer diameter $d_a$ of circumference section 20 are selected in such a way that ring surface 25, by which radial bearing ring 13 is braced in the axial direction on drive wheel 4, is sufficiently large such that a maximum compressive load per unit area of plastic radial bearing ring 13 is not exceeded. The axial forces supported via ring surface 25 on radial bearing ring 13 are transmitted to axial bearing element 12 over the latter's entire cross-sectional surface such that here too the maximum admissible compressive load per unit area for radial bearing ring 13 is not exceeded. The actual jacketed pipe support is then assumed by hardened axial bearing element 12 in the form of an axial bearing ring.

What is claimed is:

1. A threaded spindle adjusting drive, comprising:
   a threaded spindle;
   a drive gear component operably connected to the threaded spindle; and
   a bearing system configured to support axial and radial forces from at least one of the threaded spindle and the drive gear component acting on a jacketed pipe, wherein the bearing system includes:
   an axial bearing element, abutting on at least one radially inwardly directed crimp of the jacketed pipe, for supporting axial forces, the axial bearing element including a first axial-facing surface extending from the inner circumference of the jacketed pipe, and
   a radial bearing ring, separate from the drive gear component and abutting on the inner circumference of the jacketed pipe and at least a portion of the drive gear component, for supporting radial forces, the radial bearing ring including a second axial-facing surface extending from the inner circumference of the jacketed pipe, the second axial-facing surface of the radial bearing ring abutting the first axial-facing surface of the axial bearing element,
   wherein the axial bearing element and the radial bearing ring are separate components including different materials.

2. The adjusting drive as recited in claim 1, wherein the axial bearing element is hardened metal, and the radial bearing ring is plastic.

3. The adjusting drive as recited in claim 1, wherein at least one of: (a) the axial bearing element and the radial bearing ring are configured as a composite component; and (b) the axial bearing element and the jacketed pipe are configured as a composite component.

4. The adjusting drive as recited in claim 1, wherein the axial bearing element and the adjusting drive are configured as a rotary spindle drive, and wherein the threaded spindle and the drive gear are stationary relative to each other.

5. The adjusting drive as recited in claim 4, wherein at least one of the drive spindle and the drive gear is seated on a ball, and wherein the ball is seated on the axial bearing element.

6. The adjusting drive as recited in claim 4, wherein the axial bearing element is configured in the shape of a disk having an outer diameter substantially corresponding to the outer diameter of the radial bearing ring.

7. The adjusting drive as recited in claim 1, wherein the adjusting drive is configured as an immersion spindle drive, and wherein the threaded spindle penetrates the drive gear in the axial direction, the drive gear being axially adjustable relative to the threaded spindle.

8. The adjusting drive as recited in claim 7, wherein the axial bearing element is configured annularly, corresponding to the inner contour of the jacketed pipe.

9. The adjusting drive as recited in claim 7, wherein the inner thread element is situated so as to rest with a ring shoulder axially on the radial bearing ring.

10. A threaded spindle adjusting drive, comprising:
    a threaded spindle;
    a drive gear component operably connected to the threaded spindle; and
    a bearing system configured to support axial and radial forces from at least one of the threaded spindle and the drive gear component acting on a jacketed pipe, wherein the bearing system includes:
    an axial bearing ball,
    an axial bearing element, distinct from the axial bearing ball and abutting on at least one radially inwardly directed crimp of the jacketed pipe, for supporting axial forces, the axial bearing element including a first axial-facing surface extending from the inner circumference of the jacketed pipe, and
    a radial bearing ring, separate from the drive gear component and abutting on the inner circumference of the jacketed pipe and at least a portion of the drive gear component, for supporting radial forces, the radial bearing ring including a second axial-facing surface extending from the inner circumference of the jacketed pipe, the second axial-facing surface of the radial bearing ring abutting the first axial-facing surface of the axial bearing element,
    wherein the axial bearing element and the radial bearing ring are separate components including different materials.

11. A threaded spindle adjusting drive, comprising:
    a threaded spindle;
    a drive gear component operably connected to the threaded spindle; and
    a bearing system configured to support axial and radial forces from at least one of the threaded spindle and the drive gear component acting on a jacketed pipe, wherein the bearing system includes:
- an axial bearing element abutting on at least one radially inwardly directed crimp of the jacketed pipe for supporting axial forces, the radially inwardly directed crimp being formed by the application of a crimping force directed onto an outside surface of the jacketed pipe in a radially inward direction, the axial bearing element including a first axial-facing surface extending from the inner circumference of the jacketed pipe, and
- a radial bearing ring, separate from the drive gear component and abutting on the inner circumference of the jacketed pipe and at least a portion of the drive gear component, for supporting radial forces, the radial bearing ring including a second axial-facing surface extending from the inner circumference of the jacketed pipe, the second axial-facing surface of the radial bearing ring abutting the first axial-facing surface of the axial bearing element,
- wherein the axial bearing element and the radial bearing ring are separate components including different materials.

12. The adjusting drive as recited in claim 11, wherein the axial bearing element is hardened metal and the radial bearing ring is plastic.

13. The adjusting drive as recited in claim 10, wherein the axial bearing element is hardened metal and the radial bearing ring is plastic.

* * * * *